United States Patent Office 2,830,914
Patented Apr. 15, 1958

2,830,914

CALCIUM CARBONATE EXTENDER

Ernest C. McDonald, Jr., Tate, Ga., assignor to The Georgia Marble Company, Tate, Ga., a corporation of Georgia No Drawing. Application October 17, 1955
Serial No. 541,069

2 Claims. (Cl. 106—308)

This invention relates to fillers and extender pigments.

Heretofore, various extenders have been prepared and used in the formulating and compounding industries, a typical example being calcium carbonate, which is quarried and reduced through a series of steps to desired particle or micron size, in keeping with its intended use. These processes also embody a degree of purification and ultimate pulverization to remove any agglomeration from the commercial product.

Such extender pigments have been found to be satisfactory in that they are easily dispersed in water thinned vehicles; water thinned vehicles show improved settling characteristics; and color and uniformity are improved; and some floating of extender and/or colored or prime hiding pigments eliminated.

However, such extenders still leave something to be desired, and an object of this invention is to produce a superior product in the instant field.

Another object is to produce a filler and extender pigment which reduces or eliminates the need of dispersing agents.

Another object is to eliminate in such a product expensive grinding and milling when the dry product is to be redispersed.

A still further object is to make possible faster drying when such a product is used.

Another object is to provide a commercially economic extender.

These and other objects are accomplished by means of the instant invention, the practice of which embraces the following:

White marble is first quarried and sent to a primary crusher where it is reduced to rock approximately 2 inches in diameter. This rock is fed into Harding's conical mills, or similar reducing apparatus, where water is added, and the rock ground by attrition of marble against marble to fine particles of a size depending upon intended use. For example, in the manufacture of four products in this field, the following table is of interest:

|  | Product | | | |
| --- | --- | --- | --- | --- |
|  | A | B | C | D |
| Average diameter in microns | 2.5 | 6.5 | 12.5 | 15.0 |
| Percent minus 10 microns | 90.0 | 65 | 40.0 | 23.0 |
| Coarseness parameter microns | 26 | 32 | 40 | 48 |

The slurry discharged from the Harding's mills is classified as to particle size by a Bird or similar centrifuge, upon which the material discharged from the centrifuge is concentrated in the Dorr thickener and then pumped to the tanks. Such tanks are included in the circuit primarily to produce a constant feed to the driers. The resultant material is then dried on drum driers, or it may be dried by a spray process, press cake drying or other conventional means.

At this point the reduced calcium carbonate particles are subjected to a treating agent in the nature of a polymeric material containing carboxyl groups, a typical example of which may be found in what is known as Tamol 731, as manufactured and sold by Rohm-Haas Company, of Philadelphia, Pa.

Tamol 731 may be analyzed as follows:

| Combustion analysis, moisture-free basis | Percent | Atoms |
| --- | --- | --- |
| Carbon (C) | 37.90 | 3.16 |
| Hydrogen (H) | 5.72 | 5.72 |
| Sodium (Na) | 10.70 | 0.465 |
| Sulfur (S) | 0.70 | 0.022 |
| Oxygen, by difference | 44.98 | 2.81 |

The empirical formula is probably $(C_6H_{11}O_5Na)_xS$, where $x$ is approximately 45. This polyelectrolyte can be described as the sodium salt of a condensed aryl sulfonic acid.

This substance is applied in quantities of approximately $2/10$ of 1% to the dried material, although a range of from $1/100$ of 1% to 1% has been found to be satisfactory under varying conditions. The solution is added to the slurry of calcium carbonate at the mixer just prior to drying, any type of reagent feeder being employed for that purpose. In this connection, the orifice type has been found quite satisfactory.

Tamol 731 may be best classified as a general wetting agent since it exhibits very little activity in decreasing surface tension, and hence is not in the category of an emulsifying agent. The inherent action of the substance is that of a dispersing agent, the dissolving or stripping off of the mono molecular layer from the marble particles leaving them wet and in suspension without agglomeration.

It seems unlikely that the foregoing treatment results in any chemical change in the calcium carbonate, the probability being that during the drying process a mono molecular layer of the substance is deposited on each of the marble particles. It will further be noted that Tamol 731 may be applied not only to calcium carbonate, but also other powdered pigments and chemicals, with the desired results enumerated in the objects of this invention as set forth heretofore.

As a final step, the dried and treated material is then passed through a micro pulverizer from which it may be directly bagged or otherwise sent into commercial channels.

Calcium carbonate treated with the polymeric material containing carboxyl groups, results in the following beneficial actions because of dispersion characteristics: In the case of paint films the flow and leveling properties are increased. Higher solids—that is greater percentage of ground marble—can be used with the resultant viscosity and film properties remaining the same. Flooding and floating of the pigments is minimized because of better dispersion. Suspension characteristics are improved, which is desirable since it has been established in the paint industry that the better dispersion, or fewer agglomerates of pigment particles present, the less tendency there is for pigments to settle and form a hard cake in the bottom of a can.

Dispersion of the pigment can be produced by stirring or agitating, of a quality as good as that made with expensive types of milling operations such as roller mills, high speed stone mills and the like. Dispersions in water can be produced with solids increased from 60 to 65%, in case of untreated pigment; to 72 to 85% when the treated pigment is used.

While the problems of the paint industry have been emphasized herein, it is apparent that no limitation is implied thereby, but on the contrary the instant product is contemplated to be used wherever such employment is found desirable and practical in industry.

Further, while a rather specific method of production has been described herein, no limitation is intended thereby, but on the contrary the appended claims are to be accorded an interpretation and scope fairly in keeping with the contribution to the art.

I claim:

1. A readily water dispersible filler consisting essentially of crushed discrete calcium carbonate particles having an average diameter ranging from 2.5 to 15 microns and bearing a coating of from 0.01 to 1% by weight of a polyelectrolyte consisting of a sodium salt of a condensed aryl sulfonic acid.

2. A readily water dispersible filler consisting essentially of crushed discrete calcium carbonate particles having an average diameter ranging from 2.5 to 15 microns and bearing a coating of 0.2% by weight of a polyelectrolyte consisting of a sodium salt of a condensed aryl sulfonic acid.

References Cited in the file of this patent

UNITED STATES PATENTS

| | | |
|---|---|---|
| 2,260,826 | Booge | Oct. 28, 1941 |
| 2,295,291 | Roderick | Sept. 8, 1942 |
| 2,305,379 | Detrick | Dec. 15, 1942 |
| 2,323,550 | Lukens | July 6, 1943 |
| 2,668,749 | McHan | Feb. 9, 1954 |
| 2,709,160 | Korejwa | May 24, 1955 |